US008307440B1

(12) United States Patent
Canion et al.

(10) Patent No.: US 8,307,440 B1
(45) Date of Patent: Nov. 6, 2012

(54) NON-BLOCKING SHARED STATE IN AN INTRUSION-PREVENTION SYSTEM

(75) Inventors: Rodney S. Canion, West Lake Hills, TX (US); Jason D. Preston, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 818 days.

(21) Appl. No.: 12/183,394

(22) Filed: Jul. 31, 2008

Related U.S. Application Data

(60) Provisional application No. 60/953,778, filed on Aug. 3, 2007.

(51) Int. Cl.
*H04L 29/06* (2006.01)
(52) U.S. Cl. .......................................................... 726/23
(58) Field of Classification Search .................... 726/23, 726/22; 709/207, 214, 213; 713/153, 188
See application file for complete search history.

(56) References Cited

U.S. PATENT DOCUMENTS

| | | | | |
|---|---|---|---|---|
| 6,851,061 | B1 * | 2/2005 | Holland et al. | 726/23 |
| 6,981,280 | B2 * | 12/2005 | Grupe | 726/22 |
| 7,308,541 | B1 * | 12/2007 | Kisclev et al. | 711/151 |
| 7,555,621 | B1 * | 6/2009 | Pavlyushchik | 711/162 |
| 7,716,741 | B2 * | 5/2010 | Forman et al. | 726/24 |
| 2005/0108231 | A1 * | 5/2005 | Findleton et al. | 707/8 |
| 2005/0262567 | A1 * | 11/2005 | Carmona | 726/24 |

* cited by examiner

*Primary Examiner* — Ali Abyaneh

(57) ABSTRACT

A system includes a plurality of deep packet inspection engines for performing deep packet inspection on packets in a network. The deep packet inspection engines share at least some state. One of the deep packet inspection engines is assigned responsibility for writing data to the shared state. For one of the deep packet inspection engines to write data to the shared state, the deep packet inspection write provides a write request to the assigned "writer" deep packet inspection engine, which queues the request on a write queue. The writer deep packet inspection engine may queue multiple write requests from multiple deep packet inspection engines. The writer deep packet inspection engine dequeues the write requests and processes them serially, thereby avoiding the need to manage contention using locks.

19 Claims, 6 Drawing Sheets

NON-BLOCKING SHARED STATE IN AN INTRUSION-PREVENTION SYSTEM

RELATED APPLICATION

This application claims the benefit of U.S. Provisional Application No. 60/953,778 entitled "Non-Blocking Shared State in an Intrusion-Prevention System" filed Aug. 3, 2007, by Canion, et al.

BACKGROUND

As the use of digital electronic communication networks has grown in recent years, the sophistication of internal and external network attacks in the form of viruses, Trojan horses, worms, and malware of various kinds has increased dramatically. Just as dramatic is the accelerated increase of network speeds and a corresponding drop in network costs, thereby driving the rapid adoption of networks. These and other factors have necessitated the development of innovative and more advanced network security measures.

For example, Intrusion Detection Systems (IDS) can often detect network attacks, but as passive systems they generally offer little more than after-the-fact notification. In contrast, Intrusion Prevention Systems (IPS) have been developed to complement traditional security products, such as firewalls, by proactively analyzing network traffic flows and active connections while scanning incoming and outgoing requests. As network traffic passes through the IPS, it is examined for malicious packets. Such examination may be performed by one or more "deep packet inspection engines" which perform "deep packet inspection" on some or all of the packets in the network traffic. Traffic is blocked if the IPS identifies it as posing a potential threat or as being associated with an unwanted application, while legitimate traffic is allowed to pass through the system unimpeded.

Properly implemented, an IPS can be an effective network security safeguard. There are, however, needs for improved IPS capabilities. For example, an IPS may include multiple deep packet inspection engines for performing deep packet inspection on traffic flows passing through the IPS because a single deep packet inspection engine, typically implemented as a microprocessor executing a suitable operating system and software, may not be capable of processing the flows at a sufficiently high throughput. Techniques for balancing network traffic load among multiple deep packet inspection engines in an IPS to increase the aggregate performance of such engines and thereby the overall performance of the IPS are disclosed in U.S. patent application Ser. No. 11/443,490, filed by Brian C. Smith, Alexander Sarin, and Hazem M. Kadaba on May 30, 2006, entitled "Intrusion Prevention System Edge Controller"; and U.S. patent application Ser. No. 11/782,840, filed by Gerald S. Stellenberg, Brian C. Smith, and James M. Rollette on Jul. 25, 2007, entitled "System and Method for Traffic Load Balancing to Manage Muliple Processors".

Each deep packet inspection engine may execute its own software in one or more threads. Each such thread may have certain state which is local to that thread, i.e., which is not shared with other threads, such as packet fragmentation state, which is used by a single deep packet inspection engine to re-assemble individual packets that have been fragmented during transmission. Deep packet inspection engine threads may, however, have certain state which is shared among the threads, such as state that is used to track potential port scanning attacks.

One conventional way to share state among multiple threads is to use a lock, such as a semaphore or mutex. One problem with such approaches, however, is that they may cause "contention," which means that one thread may seek to acquire a lock on some shared state while another thread holds the lock. Contention may lead to "blocking" the thread that is seeking the lock, i.e., preventing that thread from further executing until the lock-holding thread releases the lock. Blocking is particularly undesirable when the blocked thread performs a time-critical function. As the number of threads sharing the same state increases, the likelihood of blocking increases.

What is needed, therefore, are techniques for improving the performance of Intrusion Prevention Systems when processing multiple flows with shared state.

SUMMARY

A system includes a plurality of deep packet inspection engines for performing deep packet inspection on packets in a network. The deep packet inspection engines share at least some state. One of the deep packet inspection engines is assigned responsibility for writing data to the shared state. For one of the deep packet inspection engines to write data to the shared state, the deep packet inspection write provides a write request to the assigned "writer" deep packet inspection engine, which queues the request on a write queue. The writer deep packet inspection engine may queue multiple write requests from multiple deep packet inspection engines. The writer deep packet inspection engine dequeues the write requests and processes them serially, thereby avoiding the need to manage contention using locks.

For example, one embodiment of the present invention is directed to a method for use with a system including a plurality of deep packet inspection engines and state shared by the plurality of deep packet inspection engines. The plurality of deep packet inspection engines include a writer deep packet inspection engine. The method includes: (A) providing a first write request from a first one of the plurality of deep packet inspection engines to the writer deep packet inspection engine; (B) queueing the first write request on a write queue; and (C) at the writer deep packet inspection engine, processing the first write request to write first data to a first unit of the shared state. The method may further include: (D) providing a second write request from a second one of the plurality of deep packet inspection engines to the writer deep packet inspection engine; (E) queueing the second write request on the write queue; and (F) at the writer deep packet inspection engine, processing the second write request to write second data to a second unit of the shared state.

Another embodiment of the present invention is directed to an intrusion prevention system including: a plurality of deep packet inspection engines, including a writer deep packet inspection engine; state, tangibly stored in a computer-readable medium, shared by the plurality of deep packet inspection engines; and wherein the writer deep packet inspection engine comprises: means for receiving a first write request from a first one of the plurality of deep packet inspection engines; means for queuing the first write request on a write queue; and means for processing the first write request to write first data to a first unit of the shared state.

Other features and advantages of various aspects and embodiments of the present invention will become apparent from the following description and from the claims.

DETAILED DESCRIPTION

Figure 1A:
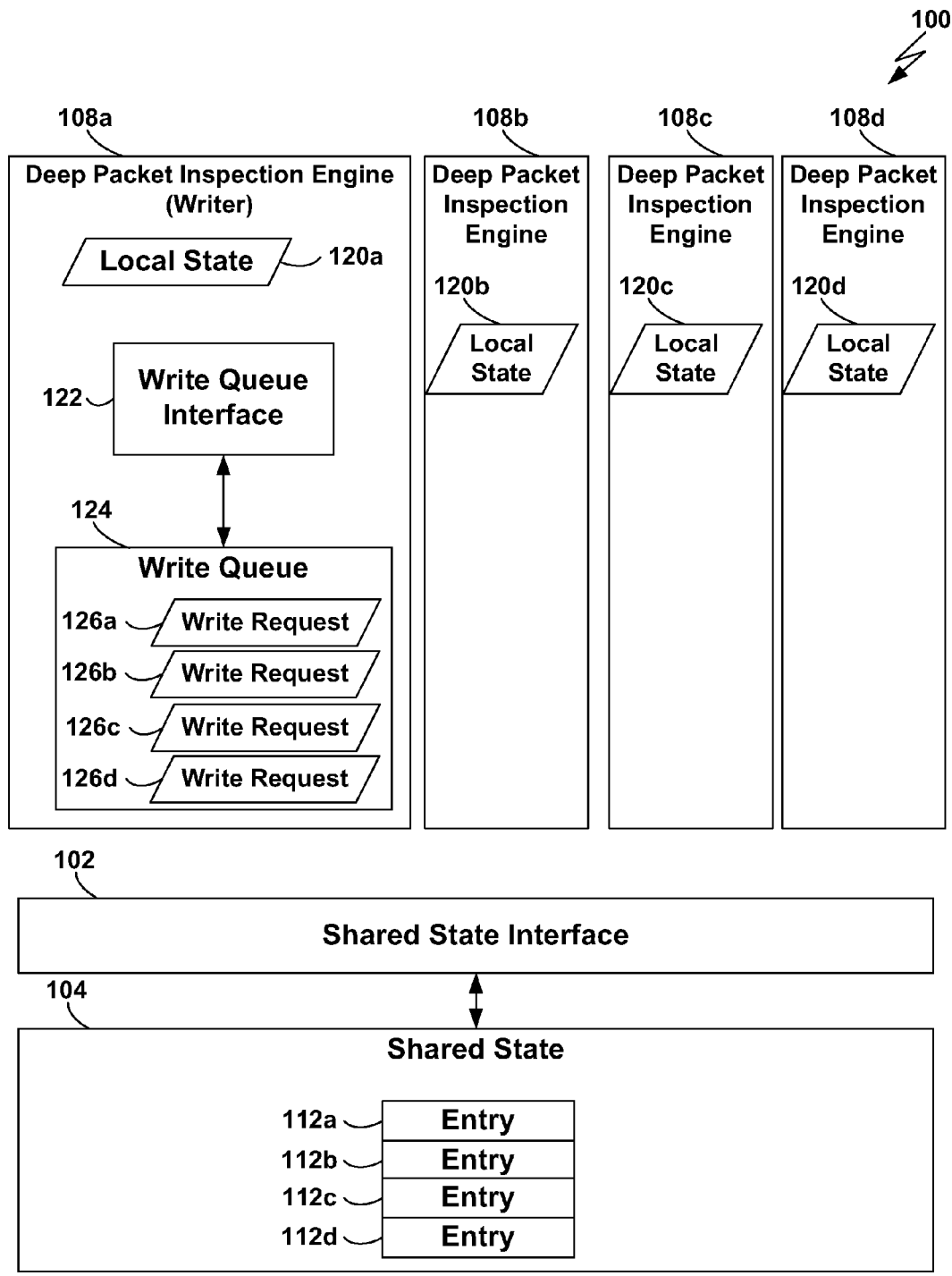
FIG. 1A is a block diagram of deep packet inspection engines executing threads having both shared and non-shared state in a network Intrusion Prevent System (IPS) according to one embodiment of the present invention.
Figure 2A:
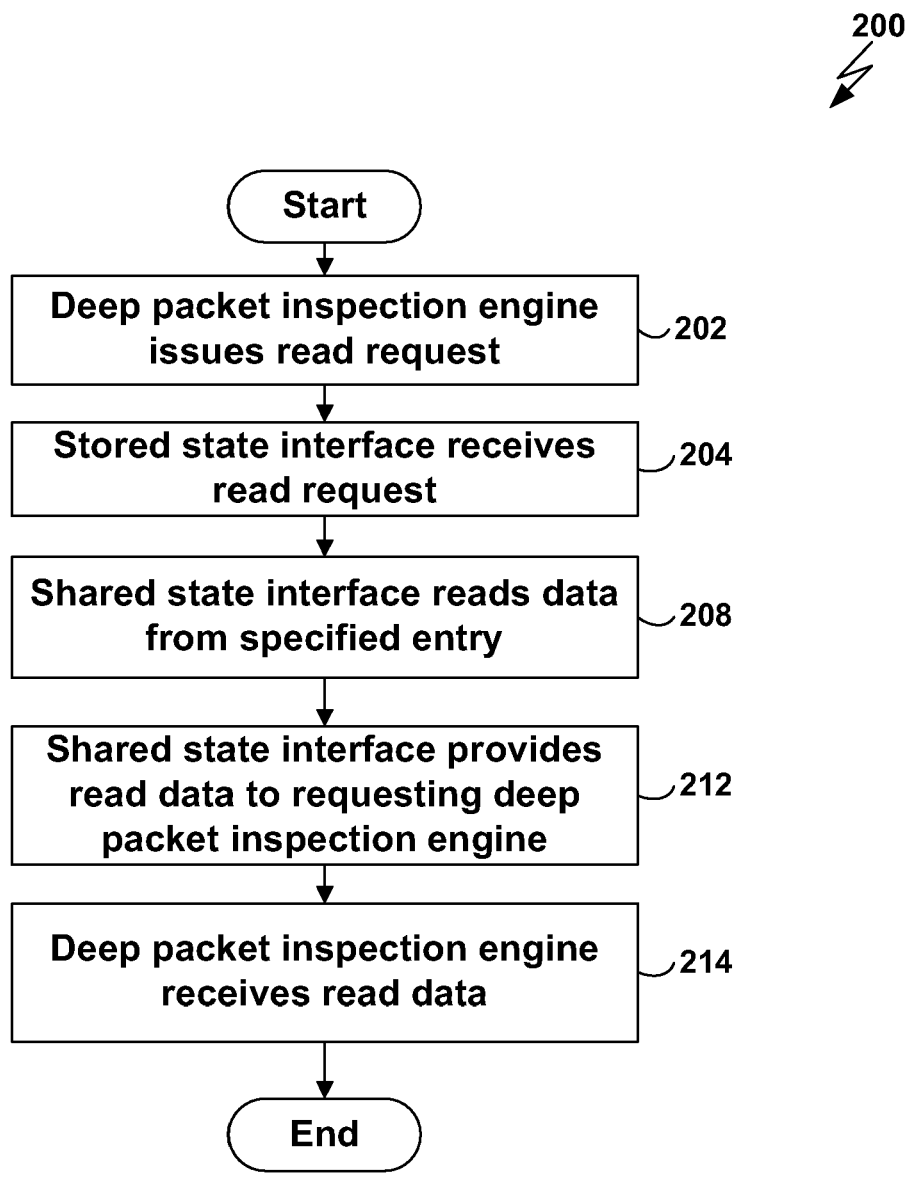
FIG. 2A is a flowchart of a method performed by the IPS to perform the operations illustrated in FIG. 1B according to one embodiment of the present invention.

Referring to FIG. 1A, a block diagram is shown of a portion of a network Intrusion Prevention System (IPS) 100 according to one embodiment of the present invention. Referring to FIG. 2A, a flowchart is shown of a method 200 performed by the system 100 of FIG. 1A according to one embodiment of the present invention.

The IPS 100 includes deep packet inspection engines 108a-d, respectively. As described in U.S. patent application Ser. Nos. 11/443,490 and 11/782,840, a load balancer may be used to distribute an incoming stream of packets among the deep packet inspection engines 108a-d. Although four deep packet inspection engines 108a-d are shown in FIG. 1A for purposes of example, there may be any number of deep packet inspection engines. For example, in one embodiment of the present invention, the IPS 100 includes 64 deep packet inspection engines, divided into two chips, each containing 32 deep packet inspection engines.

Deep packet inspection engines 108a-d store their own local states 120a-d, respectively. Examples of data that may be stored in the local states 120a-d include the fragmentation state of individual packets in the process of being received by the deep packet inspection engines 108a-d. Furthermore, the IPS 100 includes state 104 that is shared among (i.e., common to) the deep packet inspection engines 108a-d. Examples of data that may be stored in the shared state 104 include state that is used to track potential port scanning attacks. Although each of the local states 120a-d is shown as a single element in FIG. 1A for ease of illustration, each of local states 120a-d may include any amount of data.

In the embodiment illustrated in FIG. 1A, shared state 104 includes a plurality of entries 112a-d. Although four entries 112a-d are shown in FIG. 1A for purposes of example, the shared state 104 may include any number of entries. Shared state entries 112a-d may include any kind of data shared among the deep packet inspection engines 108a-d. Although shared state 104 is illustrated as a simple list or table in FIG. 1A, the shared state 104 may be represented in any kind of data structure.

Each of the deep packet inspection engines 108a-d may execute a single thread for reading from and writing to the local state 120a-d and shared state 104. For example, each of the deep packet inspection engines 108a-d may read from its own local state using conventional techniques. Locks are not required for reading from local state because each of the deep packet inspection engines 108a-d only attempts to read from and write to its own local state. As a result, there is no contention over the local states 120a-d.

In contrast, any one or more of the deep packet inspection engines 108a-d may attempt to read from and/or write to any of the shared state 104 at the same time. As described above, conventional systems typically use locks to manage contention in such circumstances. In contrast, embodiments of the present invention employ techniques for avoiding blocking when multiple deep packet inspection engines 108a-d attempt to read from or write to the same entry in the shared state 104 at the same time, without the need to use locks. Examples of such techniques will now be described.

Figure 1B:
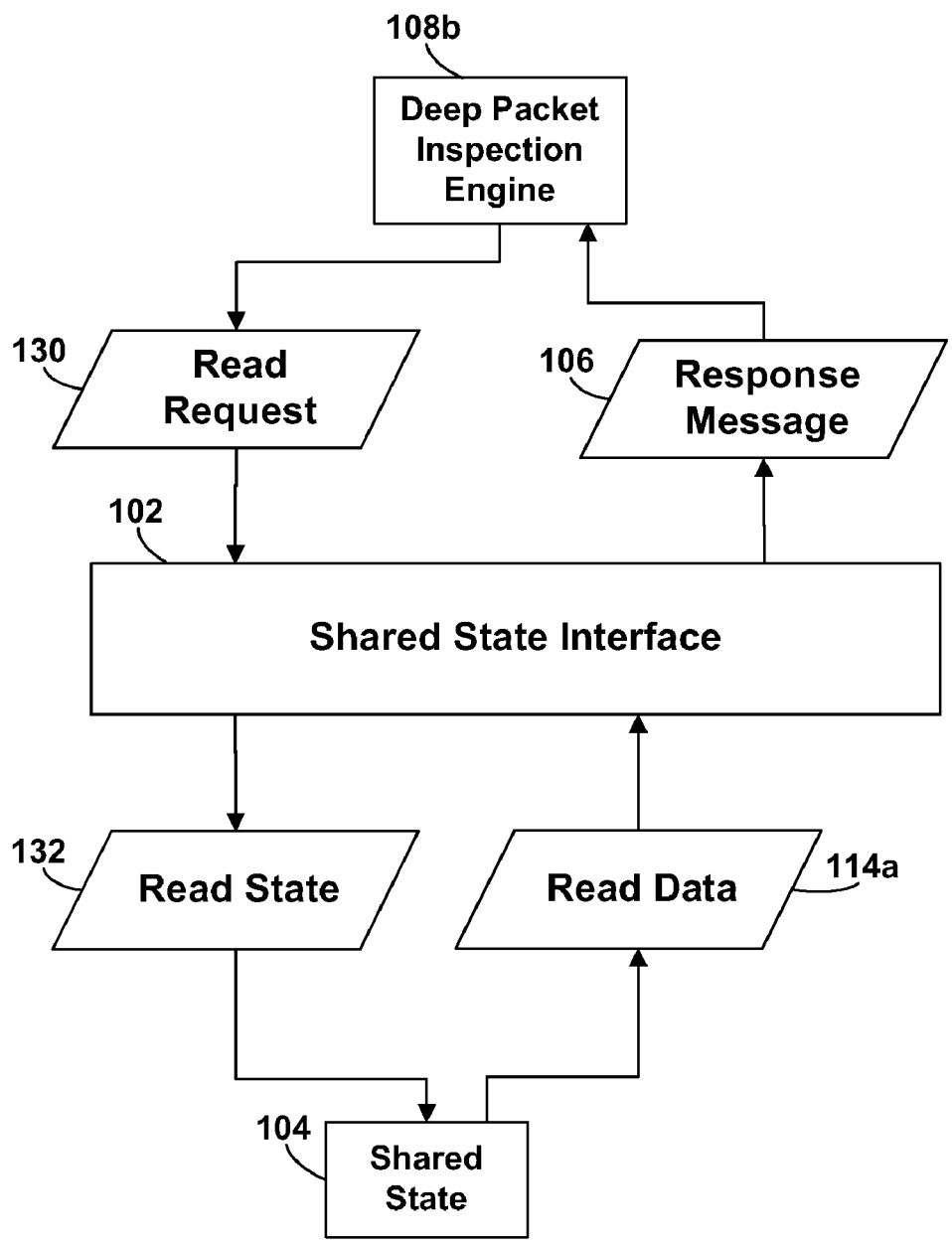
FIG. 1B is a dataflow diagram of operations performed by the IPS of FIG. 1A when one of the deep packet inspection engines attempts to read data from shared state according to one embodiment of the present invention.

Referring to FIG. 1B, a dataflow diagram is shown of operations performed by the IPS 100 when one of the deep packet inspection engines 108a-d attempts to read data from the shared state 104. Referring to FIG. 2A, a flowchart is shown of a method 200 performed by the IPS 100 in the scenario illustrated in FIG. 1B.

For purposes of example, deep packet inspection engine 108b issues a read request 130 to a shared state interface 102 (steps 202 and 204). The shared state interface 102 is responsible for handling requests to read from and write to the shared state 104, and for updating the shared state 104 in response to such requests. The read request 130 (FIG. 1B) may specify a particular one of the entries 112a-d in the shared state 104. For purposes of example, assume that the read request 130 specifies entry 112a.

In response to receiving the read request 130, the shared state interface 102 reads 132 the data from the shared state entry 112a specified by the read request 130 (step 208). Once the read operation is complete, the shared state interface 102 may provide the read data 114a to the requesting deep packet inspection engine 108b in the form of response message 106 (steps 212 and 214).

Requests from multiple ones of the deep packet inspection engines 108a-d to read the same data 114a from the same entry 112a may overlap in time. If each read request is processed atomically, such multiple read requests may be processed without causing blocking even when no locks are used. Even if, however, each read request is not processed atomically, multiple read requests may be processed without the use of locks and without delaying the processing of one request until the processing of a previous request has completed.

For example, deep packet inspection engine 108c may issue a request (not shown) to read data 114a from entry 112a before processing of the request 130 issued by deep packet inspection engine 108b has completed. In such a case, the shared state interface 102 may process the request from deep packet inspection engine 108c while it is processing the request 130 issued by deep packet inspection engine 108b, without the use of locks. This is one example of a way in which multiple deep packet inspection engines 108a-d may read from a single entry in the shared state 104 simultaneously without the use of locks.

Figure 1C:
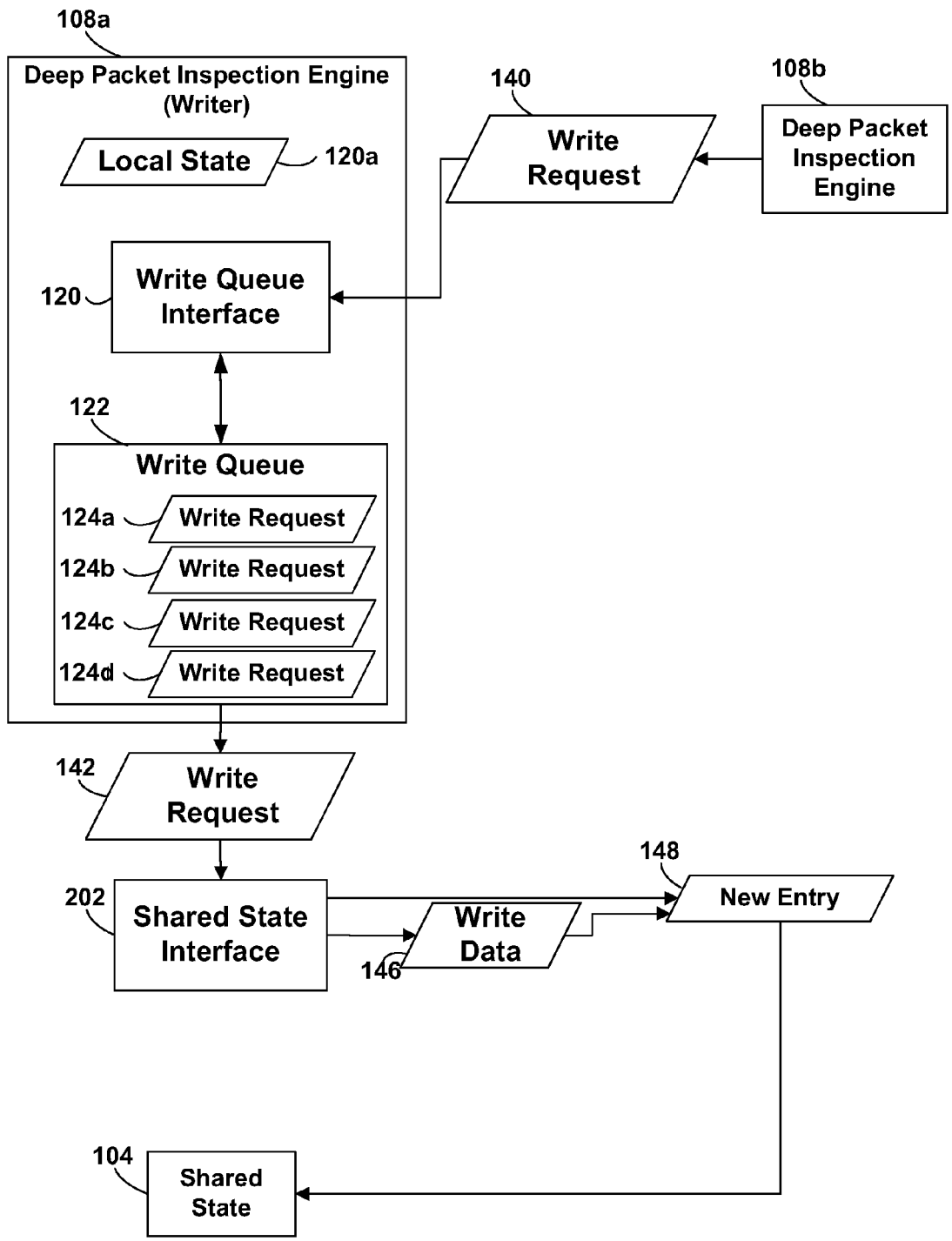
FIG. 1C is a dataflow diagram of operations performed by the IPS of FIG. 1A when one of the deep packet inspection engines attempts to write data to the shared state according to one embodiment of the present invention.
Figure 2B:
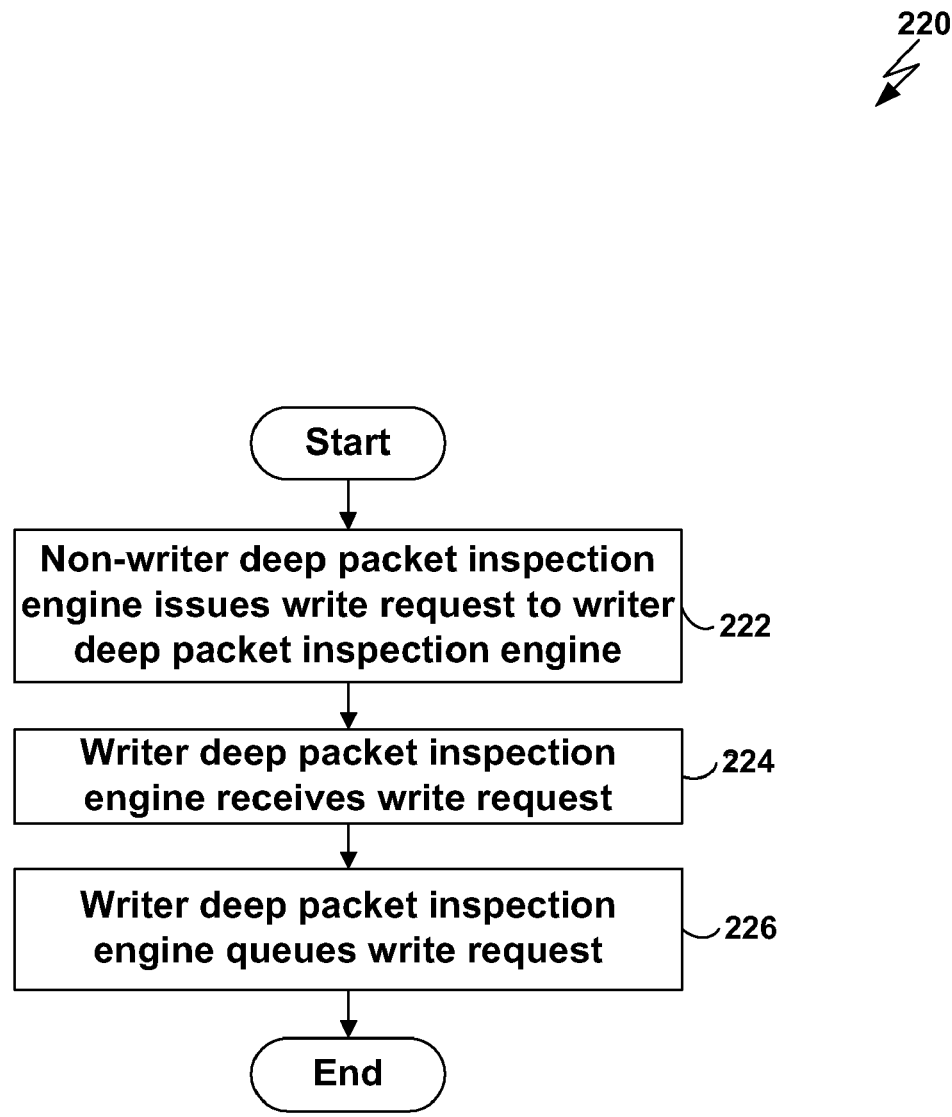
FIGS. 2B and 2C are flowcharts of methods performed by the IPS to perform the operations illustrated in FIG. 1C according to one embodiment of the present invention.

Referring to FIG. 1C, a dataflow diagram is shown of operations performed by the IPS 100 when one of the deep packet inspection engines 108a-d attempts to write data to the shared state 104. Referring to FIG. 2B, a flowchart is shown of a method 220 performed by the IPS 100 in the scenario illustrated in FIG. 1C.

First, however, note that in the embodiment illustrated in FIGS. 1A and 1C, only one of the deep packet inspection engines 108a-d writes data to the shared state 104 through the shared state interface 102. The deep packet inspection engine that is responsible for writing data to the shared state 104 is referred to herein as the "writer" deep packet inspection engine. For example, in FIG. 1A, deep packet inspection engine 108a has been designated as the writer deep packet inspection engine. The remaining deep packet inspection engines 108*b-d* do not issue write requests directly to the shared state interface 102. Instead, to write data to the shared state 104, deep packet inspection engines 108*b-d* issue write requests to the writer deep packet inspection engine (e.g., deep packet inspection engine 108*a*). A write queue interface 122 of the writer deep packet inspection engine queues all incoming write requests (including write requests issued by the writer deep packet inspection engine itself) onto a write queue 124. The write queue interface 122 dequeues write requests (e.g., in a first-in first-out order) from the write queue 122 and issues them to the shared state interface 102, which performs the requested write operations to the shared state 104.

Because all write operations are performed by the single writer engine 108*a*, write operations may be performed by the IPS 100 without the use of write locks. Instead, potential contention among write requests issued by multiple deep packet inspection engines is managed by using the writer deep packet inspection engine 108*a* to issue the queued write requests serially from the write queue 124. When the shared state interface 102 receives a request from the writer deep packet inspection engine 108*a* to write to a particular entry in the shared state 104, the shared state interface 102 performs the requested write operation on behalf of the writer deep packet inspection engine 108*a*.

If the writer deep packet inspection engine 108*a* waits for each write operation to complete before issuing the next write request, then there is no possibility of contention even between write requests from the writer deep packet inspection engine 108*a*. If the writer deep packet inspection engine 108*a* does not wait for a write operation to complete before issuing the next write request, then multiple write requests from the writer deep packet inspection engine 108*a* may contend with each other. If, however, the shared state interface 202 performs each write operation atomically, then each write request issued by the writer deep packet inspection engine 108*a* will be completely processed before processing of the next write request begins.

If it is not possible to perform a write operation atomically because, for example, the value being written is larger than the width of the bus between the shared state interface 202 and the shared state 104, then it may be necessary or desirable to use locks to prohibit the deep packet inspection engines 108*a-d* from reading from the shared state 104 while a non-atomic write operation is being processed. Even if such locks are used in a particular system when necessary, their use may be limited to those particular circumstances in which they are necessary, and not used in other circumstances.

The "writer" deep packet inspection engine may be selected and designated in any manner. For example, the writer deep packet inspection engine may be selected from among the deep packet inspection engines 108*a-d* during initialization of the IPS 100. The identity of the writer deep packet inspection engine may be stored in any manner. For example, the identity of the writer deep packet inspection engine may be stored in the shared state 104. The non-writer deep packet inspection engines may be configured to identify the identity of the writer deep packet inspection engine and to transmit all write requests to the writer deep packet inspection engine rather than to the shared state interface 102.

Returning to FIG. 1C, consider an example in which (non-writer) deep packet inspection engine 108*b* issues a write request 140 to writer deep packet inspection engine 108*a* to write a specified value to a specified one of the entries 112*a-d* in the shared state 104 (steps 222 and 224). Assume for purposes of the following example that the write request 140 is a request to write a specified value to the data portion 114*a* of entry 112*a*. Note, however, that other kinds of write operations may be performed, such as "increment" and "decrement" operations, which involve reading from and writing to data portion 114*a* atomically.

In response to receiving the write request 140, the write queue interface 122 of the writer deep packet inspection engine 108*a* queues the write request 140 onto the write queue 122 (step 226). The queue 122 may, for example, be a first-in first-out (FIFO) queue.

Although only the single write request 140 is shown in FIG. 1C, multiple write requests may be queued onto the write queue 122 in the manner just described. Such write requests may be issued by any combination of the deep packet inspection engines 108*a-d*. In the case of write requests issued by the writer deep packet inspection engine 108*a*, the write request 140 may be transmitted internally within the writer deep packet inspection engine 108*a* in a different form than write requests issued by non-writer deep packet inspection engines 108*b-d*.

Figure 2C:
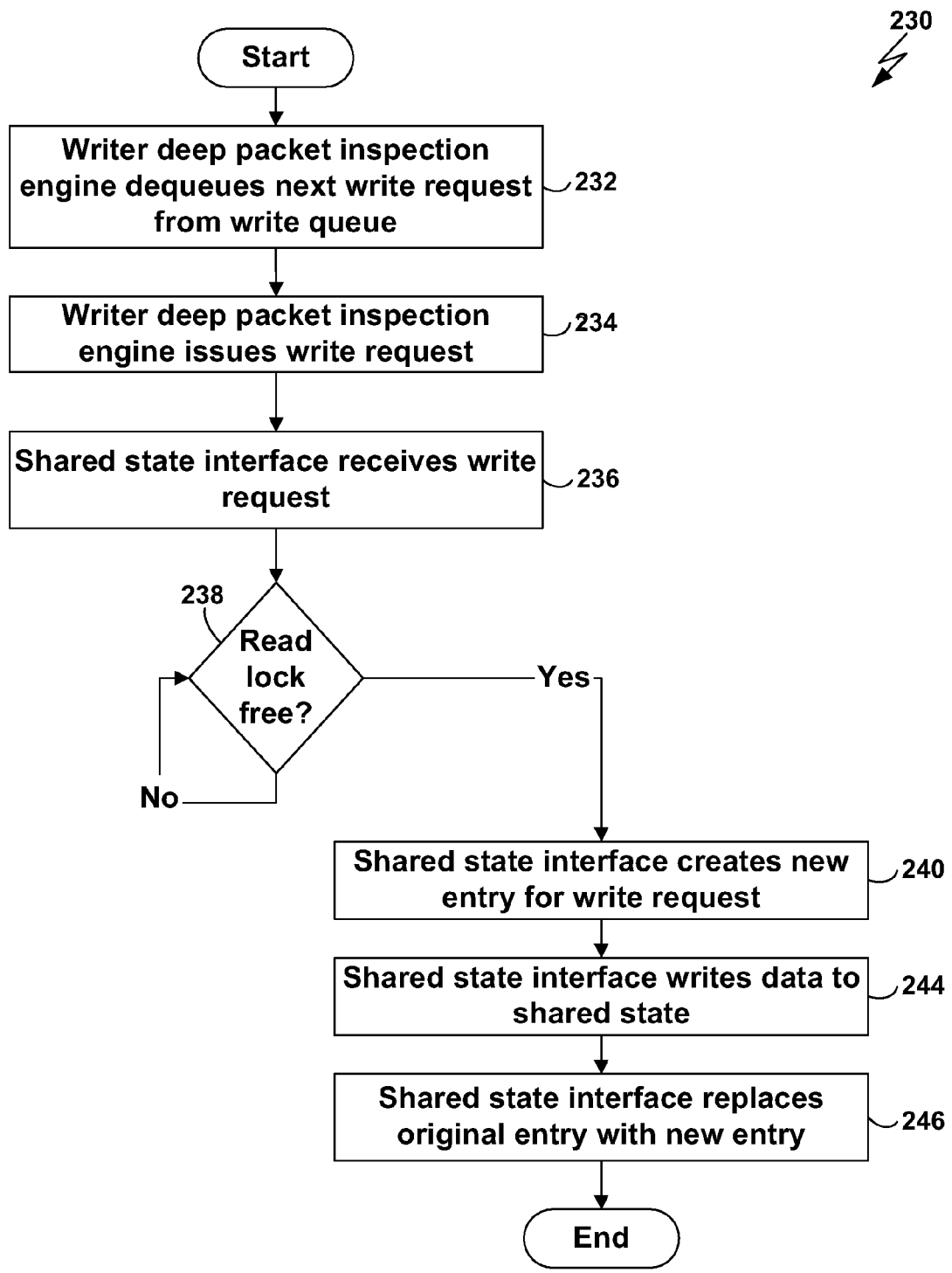

Referring to FIG. 2C, a flowchart is shown of a method 230 that may be performed by the IPS 100 to process write requests from the write queue 122, as further illustrated in FIG. 1C. The method 230 of FIG. 2C may be performed in parallel with the method 220 of FIG. 2B. In other words, write requests may be processed from the write queue 122 as additional write requests are queued onto the write queue 122.

The write queue interface 122 dequeues the next write request 142 from the write queue 122 (step 232). If the write queue 122 is a FIFO, then the write request 142 is the oldest write request in the write queue 122. Assume for purposes of example, however, that the write request 142 that is dequeued from the write queue 122 in FIG. 1C is the write request 140 previously issued by the deep packet inspection engine 108*b*.

Deep packet inspection engine 108*a* issues the write request 142 to the shared state interface 102 (steps 234 and 236). Note that the deep packet inspection engine 108*a* may translate the original write request 140 from deep packet inspection engine 108*b* into multiple read and/or write requests, such as those for implementing an "increment," "decrement," or other "read-modify-write" command. If reads locks are being used, such as in the case where the value being written is wider than the width of the bus, then in response to receiving the write request 142, the shared state interface 102 may determine whether all of the read locks for the entry 112*a* specified by the write request 142 are free by reading the state 150 of the read lock 114*b* (step 238). If any of the read locks for the specified entry are not free (e.g., if read lock 114*b* is owned by any of the deep packet inspection engines), then the shared state interface 102 blocks the writer deep packet inspection engine 108*a* from writing to entry 112*a* until all of the read locks for entry 112*a* become free. This allows any pending read requests for the entry 112*a* to complete before beginning to modify the entry 112*a*. If, however, read locks are not being used, then step 238 may be omitted.

It is possible that one of the deep packet inspection engines 108*a-d* will attempt to read from the shared state entry 112*a* while the shared state interface 202 is modifying (i.e., writing to) it. Such read operations could read from the shared state entry 112*a* while it is in a partially-modified, and therefore invalid, state.

To avoid this situation, in the embodiment illustrated in FIGS. 1C and 2C, the share state interface 102 creates a new entry 148 in the shared state 104 (step 240). As will be described in more detail below, the new entry 148 will eventually replace the entry 112*a* that is the subject of the write request 142.

More specifically, the shared state interface 102 writes the data 146 specified in the write request 142 to the new entry 148 (step 244). Note that the original entry 112*a* remains unchanged while the new entry 148 is modified. As a result, any read requests issued by the deep packet inspection engines 108*a-d* to read from the original entry 112*a* while a write request to the original entry 112*a* is pending will result in reading the original data 114*a* from the original entry 112*a*, even after data have been written to the new entry 148. The problem of reading from the entry 112*a* while it is in an invalid state is thereby avoided, without the use of locks.

Once the write operation to the new entry 148 is complete, the shared state interface 102 may replace the original entry 112*a* with the new entry 148 (step 246). For example, the shared state interface 204 may perform an atomic write operation over the original entry 112*a* with the data 146 in the new entry 148. Alternatively, for example, a pointer to the original entry 112*a* may be changed atomically to point to the new entry 148. In either case, the new entry 148 is effectively incorporated into the shared state 104 atomically and subsequent read requests issued by the deep packet inspection engines 108*a-d* are directed to the new entry 148.

The techniques disclosed above eliminate contention and guarantee that all read and write requests to a shared data structure entry will be atomic. These techniques do not, however, guarantee that a read-modify-write operation on a shared data structure entry will be atomic. In other words, if one of the deep packet inspection engines 108*a-d* reads an entry, modifies it, and writes back the modified value, there is no guarantee that another one of the deep packet inspection engines 108*a-d* has not modified the same entry in the interim.

If one of the deep packet inspection engines 108*a-d* needs to perform an atomic read-modify-write operation, then a specific "read-modify" command may be implemented in the writer deep packet inspection engine 108*a*, examples of which are the "increment" and "decrement" commands described above. The deep packet inspection engine that needs to perform an atomic read-modify-write operation may then send a "read-modify" message to the writer deep packet inspection engine 108*a*, which may then perform the read-modify operation atomically and provide the results of the read operation back to the requesting deep packet inspection engine.

One advantage of techniques disclosed herein is that they enable shared state to be implemented within an intrusion prevent system without causing blocking, and without the need to use locks, such as semaphores or mutexes. In particular, delegating all responsibility for write operations to one of the deep packet inspection engines 108*a-d* eliminates the possibility of write blocking among the deep packet inspection engines. Such techniques therefore reduce or eliminate the delays typically caused by blocking schemes based on semaphores or mutexes. Elimination of delays in performing deep packet inspection not only increases the overall performance of the IPS and therefore improves network security, but also improves performance of the network more generally.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

For example, although the shared state interface 102 is shown as a separate component in FIGS. 1A-1C, this is not a requirement of the present invention. The shared state interface 102 and the shared state 104 may, for example, be incorporated into the writer deep packet inspection engine 108*a-d*.

Although in certain embodiments disclosed herein a single one of the deep packet inspection engines 108*a-d* is permanently or semi-permanently designated as the "writer" deep packet inspection engine, this is not a requirement of the present invention. For example, the identity of the writer deep packet inspection engine may change over time, in which case responsibility for managing the write queue 122 may shift from one deep packet inspection engine to another over time. Furthermore, although the write queue interface 120 and write queue 122 are illustrated in FIGS. 1A and 1C as being within the deep packet inspection engine 108*a*, the write queue interface 120 and write queue 122 may be located elsewhere in the system 100.

Although in certain embodiments disclosed herein, each of the deep packet inspection engines 108*a-d* executes a single thread, this is not a limitation of the present invention. For example, each deep packet inspection engine may execute its own writer thread and reader thread.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor.

Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for use with a system including a plurality of deep packet inspection engines and state shared by the plurality of deep packet inspection engines, wherein one of the plurality of deep packet inspection engines is a writer deep packet inspection engine, the method comprising:
    (A) receiving, at the writer deep packet inspection engine, a first write request from a first one of the plurality of deep packet inspection engines, wherein the plurality of deep packet inspection engines comprise microprocessors and are to perform deep packet inspection on packets in a network traffic for malicious packets;
    (B) queueing, at the writer deep packet inspection engine, the first write request on a write queue;
    (C) dequeuing, at the writer deep packet inspection engine, the first write request from the write queue when the first write request reaches an end of the write queue, wherein the dequeued first write request comprises first data; and
    (D) issuing, by the writer deep packet inspection engine, the dequeued first write request to an interface of the shared state, wherein the interface of the shared state is to write the first data of the dequeued first write request to a first unit of the shared state.

2. The method of claim 1, further comprising:
    (E) receiving, at the writer deep packet inspection engine, a second write request from a second one of the plurality of deep packet inspection engines;
    (F) queueing, at the writer deep packet inspection engine, the second write request on the write queue; and
    (G) dequeuing, at the writer deep packet inspection engine, the second write request from the write queue when the second write request reaches the end of the write queue; and
    (H) issuing, by the writer deep packet inspection engine, the dequeued second write request to the interface of the shared state, wherein the interface of the shared state is to write second data of the dequeued second write request to a second unit of the shared state.

3. The method of claim 2, wherein (E) and (F) are performed before (C).

4. The method of claim 1, further comprising:
    initializing a second unit of the shared state;
    writing the first data to the second unit of the shared state; and said method further comprising:
    replacing the first unit of the shared state with the second unit of the shared state.

5. The method of claim 4, further comprising:
    receiving a read request from one of the plurality of deep packet inspection engines to read data from the first unit of the shared state; and
    satisfying the read request by reading data from the first unit of the shared state.

6. The method of claim 1, further comprising:
    receiving, at the writer deep packet inspection engine, packets contained in the network traffic; and
    performing, at the writer deep packet inspection engine, deep packet inspection on the packets to identify potential threats to the network.

7. The method of claim 1, wherein the state shared by the plurality of deep packet inspection engines comprises data to be used to track potential port scanning attacks.

8. The method of claim 1, wherein issuing the deuqueued first write request to the interface of the shared state further comprises issuing, by the writer deep packet inspection engine, the dequeued first write request to the interface of the shared state without using a write lock on the shared state.

9. An intrusion prevention system comprising:
    a plurality of deep packet inspection engines, wherein one of the plurality of a deep packet inspection engines is a writer deep packet inspection engine;
    state, stored in a non-transitory computer-readable medium, shared by the plurality of deep packet inspection engines; and
    wherein the writer deep packet inspection engine is to:
        receive a first write request from a first one of the plurality of deep packet inspection engines, wherein the plurality of deep packet inspection engines comprise microprocessors and are to perform deep packet inspection of packets in a network traffic for malicious packets;
        queue the first write request on a write queue;
        dequeue the first write request from the write queue when the first write request reaches an end of the write queue, wherein the dequeued first write request comprises first data; and
        issue the dequeued first write request to an interface of the shared state, wherein the interface of the shared state is to write the first data of the dequeued first write request to a first unit of the shared state.

10. The intrusion prevention system of claim 9, wherein the state, stored in the non-transitory computer-readable medium, shared by the plurality of deep packet inspection engines comprises data to be used to track potential port scanning attacks.

11. The intrusion prevention system of claim 9, wherein the plurality of deep packet inspection engines are to receive the packets in the network traffic and to perform deep packet inspection on the packets to identify potential threats to the network.

12. The intrusion prevention system of claim 9, wherein the writer deep packet inspection is to issue the dequeued first write request to an interface of the shared state without using a write lock.

13. A non-transitory computer readable storage medium on which is embedded a computer program, said computer program implementing a method for operating a writer deep packet inspection engine, said computer program comprising a set of instructions to:
    receive a first write request from a first one of a plurality of deep packet inspection engines, wherein the plurality of deep packet inspection engines are to perform deep packet inspection on packets in a network traffic for malicious packets and wherein the writer deep packet inspection engine is one of the plurality of deep packet inspection engines;
    queue the first write request on a write queue;
    dequeue the first write request from the write queue when the first write request reaches an end of the write queue, wherein the dequeued first write request comprises first data; and
    issue the dequeued first write request to an interface of the shared state, wherein the interface of the shared state is to write the first data of the dequeued first write request to a first unit of a state that is shared by the plurality of deep packet inspection engines.

14. The non-transitory computer readable storage medium of claim 13, said computer program further comprising a set of instructions to:

receive a second write request from a second one of the plurality of deep packet inspection engines;
queue the second write request on the write queue;
dequeue the second write request from the write queue when the second write request reaches the end of the write queue; and
issue the dequeued second write request to the interface of the shared state, wherein the interface of the shared state is to write second data of the dequeued second write request to a second unit of the shared state.

15. The non-transitory computer readable storage medium of claim 13, said computer program further comprising a set of instructions to:

initialize a second unit of the shared state;
write the first data to the second unit of the shared state; and
replace the first unit of the shared state with the second unit of the shared state.

16. The non-transitory computer readable storage medium of claim 15, said computer program further comprising a set of instructions to:

receive, following writing of the first data to the second unit of the shared state, a read request from one of the plurality of deep packet inspection engines to read data from the first unit of the shared state; and
satisfy the read request by reading data from the first unit of the shared state.

17. The non-transitory computer readable storage medium of claim 13, wherein the state shared by the plurality of deep packet inspection engines comprises data to be used to track potential port scanning attacks.

18. The non-transitory computer readable storage medium of claim 13, said computer program further comprising a set of instructions to:

receive packets contained in a network traffic; and
perform deep packet inspection on the packets to identify potential threats to the network.

19. The non-transitory computer readable storage medium of claim 13, said computer program further comprising a set of instructions to:

issue the dequeued first write request to the interface of the shared state without using a write lock on the shared state.

* * * * *